L. W. HOLUB.
CHUCK.
APPLICATION FILED NOV. 23, 1908.
943,616.
Patented Dec. 14, 1909.
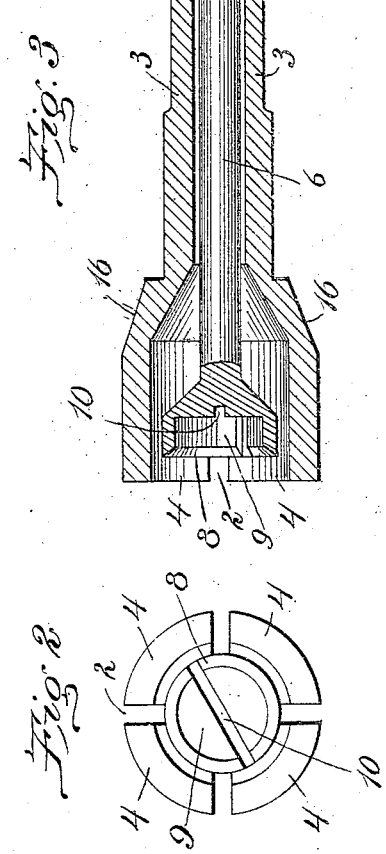
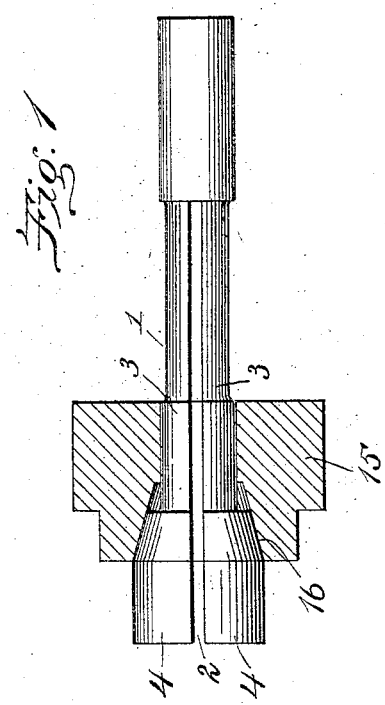
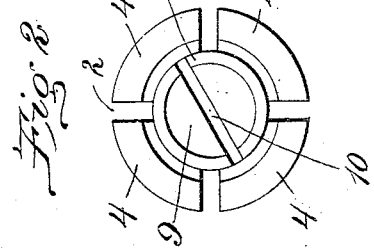
WITNESSES
Stephen S. Newton
William R. Baird
INVENTOR
Louis W. Holub
BY
his ATTORNEY

UNITED STATES PATENT OFFICE.

LOUIS W. HOLUB, OF NEW YORK, N. Y., ASSIGNOR TO HOLUB-DUSHA CO., OF NEW YORK, N. Y., A CORPORATION OF NEW YORK.

CHUCK.

943,616.  Specification of Letters Patent.  Patented Dec. 14, 1909.

Application filed November 23, 1908. Serial No. 463,969.

*To all whom it may concern:*

Be it known that I, LOUIS W. HOLUB, a citizen of the United States, and a resident of the city, county, and State of New York, have invented certain new and useful Improvements in Chucks, of which the following is a specification.

My present invention relates to an improved chuck applicable to holding pearl or other button blanks, but not necessarily limited to this use and has advantages over the chucks heretofore used for such purposes, as will appear best after an understanding of the following specification and the annexed drawing.

In the old style chucks, it is usual to have the face of the jaws recessed; that is to say, ground out on their inner sides to form an interior rim or backing for supporting the rear face of the button blank when in the chuck. In the use of this chuck, the thousands of blanks chucked per day wear off the inner front edge or corner of the jaws so that the interior gripping portion of the jaws is so reduced that there is insufficient left to properly grip the periphery of the button blank. Whenever this happens, and it is a comparatively frequent occurrence, it becomes necessary to grind off the face of the chuck so as to reduce the jaws in length by removing their aforesaid rounded off ends. This having been done, the further much more difficult operation is necessary, which is that of grinding the ends of the jaws to re-form the required recess to give a rim or backing for the button blanks to rest against when in the chuck. This last operation takes much time and is entirely avoided in the use of the chuck of my present invention, wherein the backing for the button blank is not an integral part of the jaws but is a separate member, adjustable relative to the jaws to be recessed at will to any desired extent back from their ends.

The advantages of my present chuck will be more fully apparent from the following description thereof in connection with the drawings, wherein—

Figure 1 is a side elevation of one form of chuck within my invention, together with a related part comprising a collar shown in cross section, Fig. 2 is an end elevation of the devices shown in Fig. 3, looking at the left hand end thereof, Fig. 3 is a middle section, on an enlarged scale, of the devices shown in Fig. 1, omitting the collar member 15, certain of said parts being shown in elevation, and Fig. 4 is an elevation of a screw plug used in connection with the devices of the other figures.

Describing now the chuck of my invention with particular reference to the devices of the drawings, and reserving it to the claim to point out the novel features, the chuck shown comprises an axially hollow spindle or member 1, slotted longitudinally at 2 through its walls to form arms 3. It will be noted that the slotted portion of the spindle which is at the ends of the arms 3 is enlarged, constituting contractile jaws 4 to receive and grip between them the periphery of the button blank. The springiness of the arms gives said jaws preferably normal tendency outward so that when released they normally expand to release the blank. It will be noted that the non-split portion of the spindle has its interior screw threaded at 5. Located to be lengthwise adjustable within the hollow of the spindle is a stem 6, screw-threaded at one end 7 to engage the threads in the interior of the spindle and at its other end being preferably enlarged and there forming an abutment 8, receiving against it the rear face of the blank when chucked. The particular abutment head or end shown is cupped out at 9 so that the button blank rests against merely an annular rim, but this is not an essential feature and will vary with the particular nature of the work which is to be executed on the button blank in the chuck. Thus, for some purposes it may be desirable to have the end or face of the abutment substantially flat and not cupped out. Since the abutment head screw connects with the spindle through the stem 6, it will be apparent that it can be adjusted into different positions so as to be recessed to a greater or less distance inside the mouth of the chuck. To effect this adjustment, said head 8 may be grooved across its face at 10 for engagement with a screw driver. To permanently lock the abutment head in the desired position of adjustment, I have provided an externally threaded plug 11, inserted into the spindle opening from its rear end and engaging the threads in said opening, said plug having a preferably blunt point 12 to be received against the end of the stem 6 and at its other end having a slot 14 for engagement with a screw driver. By taking up on said plug by means of a screw driver until its point engages with the requisite thrust against the end of the stem, it is apparent that said stem and its head will be locked in permanent relation within the spindle. The point 12 has insufficient frictional engagement with the end of the stem 6 to be turned along with said stem; accordingly, it prevents said stem from turning and effectually locks it, as desired, in stationary position to maintain the abutment head 8 fixed in the desired position of adjustment. The point 12 is preferably blunt rather than sharp to do away with the marring which would otherwise take place of the end of the stem.

The manner of support of the chuck in the machine is not material to my present invention and consequently I have not attempted to show it, except to the extent of indicating the collar member 15, which ordinarily will be employed, surrounding the spindle and adapted to be pressed forward against the inclined outside shoulders 16 of the jaws to contract them into gripping position, and then adapted to be operated reversely to permit the jaws to expand.

Having thus described my invention, what I claim is:

A chuck having jaws and a cylindrical bore open at both ends and leading from the space between the jaws to the rear of the chuck, said bore being internally screw-threaded, a stem within said bore which is screw-threaded to engage the threads of the bore, and being adjustable lengthwise of the bore to recess its head end to a greater or less extent within the mouth of the chuck, said head end forming a backing for the object held between the jaws, and a pointed screw plug engaging the threads of the bore with its point directed toward the rear end of the stem and adapted to abut against it.

In witness whereof, I have signed my name to the foregoing specification in the presence of two subscribing witnesses.

LOUIS W. HOLUB.

Witnesses:
 GUSTAV SCHARWACHTER,
 PAUL F. DUSHA.